No. 713,279. Patented Nov. 11, 1902.
F. BINS.
SHEPHERD'S CROOK.
(Application filed July 29, 1902.)
(No Model.)
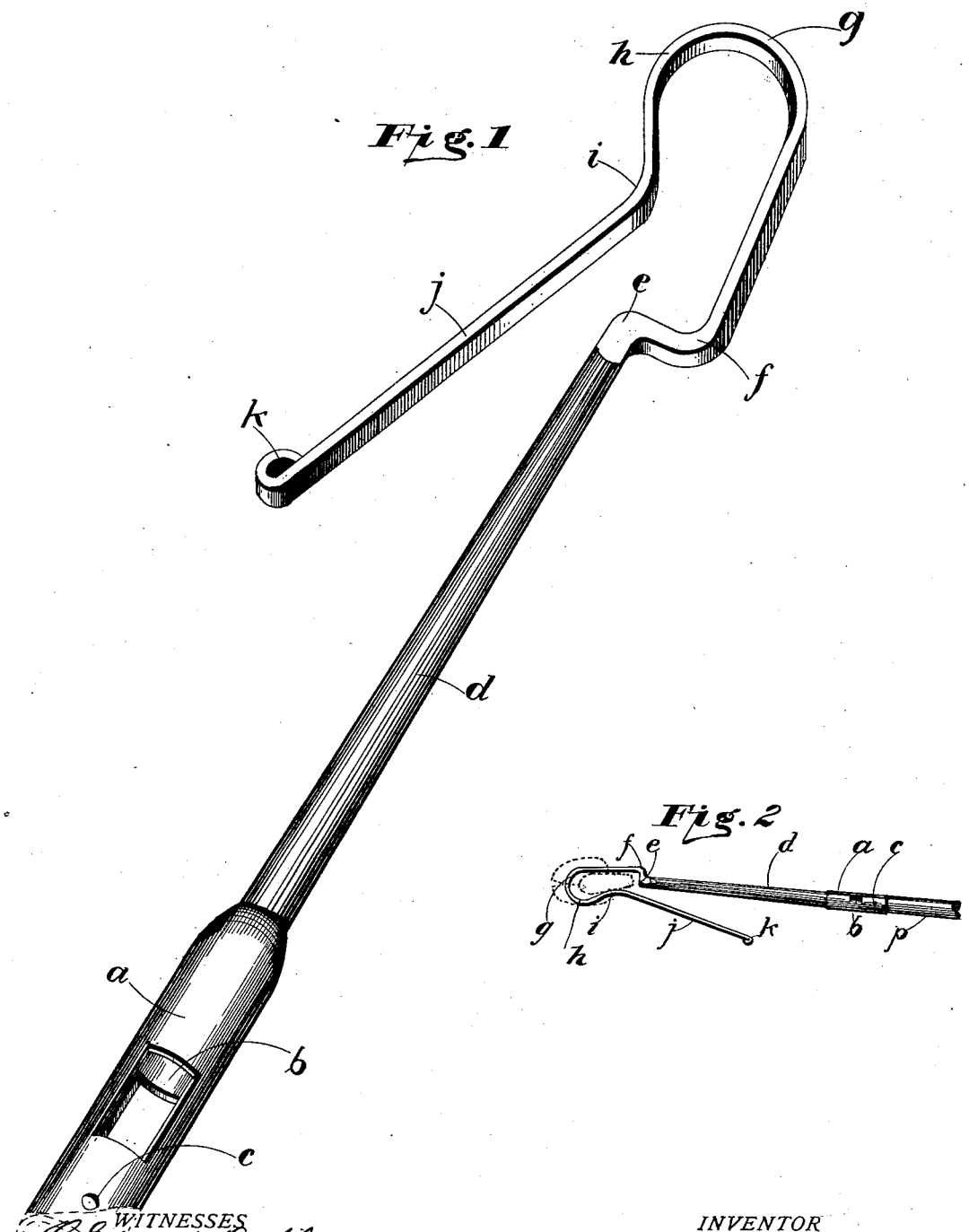
INVENTOR
Frank Bins
By Alexander & Dowell
Attorneys
WITNESSES

UNITED STATES PATENT OFFICE.

FRANK BINS, OF FLATWILLOW, MONTANA.

SHEPHERD'S CROOK.

SPECIFICATION forming part of Letters Patent No. 713,279, dated November 11, 1902.

Application filed July 29, 1902. Serial No. 117,508. (No model.)

*To all whom it may concern:*

Be it known that I, FRANK BINS, of Flatwillow, in the county of Fergus and State of Montana, have invented certain new and useful Improvements in Shepherds' Crooks; and I hereby declare that the following is a full, clear, and exact description thereof, reference being had to the accompanying drawings, which form part of this specification.

This invention is an improved shepherd's crook for catching and holding animals; and its object is to provide a novel one-piece crook of peculiar form which can be readily engaged and disengaged from an animal's leg, but when engaged will hold the animal securely yet comfortably and prevent it kicking loose, and which can also be readily attached to handles or staffs.

The invention is summarized in the claims following the description, and the accompanying drawings illustrate a crook constructed in accordance therewith.

Figure 1 is a perspective view of the crook, and Fig. 2 a detail view illustrating the use thereof.

The crook comprises a socket $a$, by which it is attached to a staff or pole $p$ of any desired length. Preferably this socket has openings $b$ in its sides, which, in case the staff should break, enable its end to be readily extracted from the socket. The socket may also have holes $c$ for passage of nails or screws to fasten it to the staff. From the socket extends the shank $d$, and at the outer end of the shank the crook is bent at right angles to the shank at $e$ and then bent outwardly again at $f$, the part between the bends $e\ f$ forming what I term a "locking-bar." The crook extends forwardly from bend $f$ a short distance and then is bent backwardly upon itself, as at $g$, and returned almost to bend $e$, and then bent outwardly again at $i$. The portion of the crook from $f$ to $i$ I term the "loop." From bend $i$ the crook is extended preferably in a straight line to its end, which may be coiled upon itself, so as to form a blunt point $k$, as shown, which will not injure the stock. The straight portion $j$, between $i$ and $k$, I term the "directing-bar." The bends $i$ and $e$ are adjacent, the space between them forming a lateral entrance to the loop sufficiently wide to allow the small portion of the leg of a sheep (or other animal to catch which the crook is designed) to enter the loop formed between and within the bends $f$ and $i$, as shown. The directing-bar $j$ of the crook extends at an angle to the shank $d$ and facilitates the catching of an animal's leg. It will be noted that the loop has an inward bend $h$ between the points $g$ and $i$, which bend is adapted to direct the leg of the animal against the locking-bar between points $e$ and $f$, which bar will prevent the animal's leg slipping out of the loop by an endwise movement of the crook and will also prevent the animal kicking out of the loop, as can be done with the ordinary styles of crooks, in which the entrance to the loop is at one end thereof, whereas it will be observed in my crook the entrance is at one side of the loop and requires a longitudinal and lateral movement of the crook to engage or disengage it from the animal's leg, although the engagement of the loop or catching of the animal is facilitated by the directing-bar $j$ and may be accomplished by merely pulling backward on the crook; but in disengaging the crook a straight push forward thereon would cause the locking-bar (or portion between bends $e\ f$) to bear directly against the leg. Hence in disengaging it is necessary to push the crook forward and to one side, so as to cause the leg to slip out through the lateral opening between the points $e\ i$. This peculiar construction will prevent an animal kicking out of the crook after its foot is caught in the loop, and by slightly turning the handle and crook it will be impossible for a sheep to free its foot therefrom.

The integral "locking-bar," as I term the portion between bends $e\ f$, is one of the most important features of the crook. It answers the purposes of the spring-catches commonly employed in animal-catching devices without any danger of disarrangement of parts or complicating the construction of crook. I prefer to have the shank $d$ circular in cross-section and the remainder of the crook proper oval or band shaped in cross-section, the corners being rounded, so as not to injure the stock; but the dimensions and cross-section of the crook may be varied to suit the makers and users, and is therefore not a material feature of my invention.

Having thus described my invention, what

I therefore claim as new, and desire to secure by Letters Patent thereon, is—

1. The herein-described crook, consisting of the socket, the shank, the locking-bar at the outer end of shank, a loop springing from the locking-bar and bent inwardly toward the shank and having an inward curve at $h$ in the side next the opening, and a directing-bar extending from the loop at an angle to the shank, substantially as described.

2. A shepherd's crook having the upper portion of its shank bent outward at right angles, then upward on a line approximately parallel to the main body of the shank, then inwardly curved and finally terminating in a directing-bar bent approximately at an acute angle so as to form a wedge-like entrance to crook, all substantially as shown and described.

In testimony that I claim the foregoing as my own I affix my signature in presence of two witnesses.

FRANK BINS.

In presence of—
JOHN H. DESKINS,
FRED. W. PETERS.